(12) United States Patent
Goettler et al.

(10) Patent No.: US 10,044,056 B2
(45) Date of Patent: Aug. 7, 2018

(54) FUEL CELL SYSTEM INCLUDING SACRIFICIAL NICKEL SOURCE

(71) Applicant: LG Fuel Cell Systems, Inc., North Canton, OH (US)

(72) Inventors: Richard W. Goettler, Medina, OH (US); Liang Xue, Canton, OH (US)

(73) Assignee: LG FUEL CELL SYSTEMS, INC., North Canton, OH (US)

( * ) Notice: Subject to any disclaimer, the term of this patent is extended or adjusted under 35 U.S.C. 154(b) by 577 days.

(21) Appl. No.: 14/213,590

(22) Filed: Mar. 14, 2014

(65) Prior Publication Data

US 2014/0272666 A1   Sep. 18, 2014

Related U.S. Application Data

(60) Provisional application No. 61/794,979, filed on Mar. 15, 2013.

(51) Int. Cl.
| | |
|---|---|
| *H01M 4/38* | (2006.01) |
| *H01M 8/10* | (2016.01) |
| *H01M 8/1213* | (2016.01) |
| *H01M 8/2404* | (2016.01) |
| *H01M 4/90* | (2006.01) |
| *H01M 8/243* | (2016.01) |
| *H01M 4/86* | (2006.01) |
| *H01M 8/124* | (2016.01) |

(52) U.S. Cl.
CPC ......... *H01M 8/1213* (2013.01); *H01M 4/905* (2013.01); *H01M 8/243* (2013.01); *H01M 8/2404* (2016.02); *H01M 4/8621* (2013.01); *H01M 2008/1293* (2013.01)

(58) Field of Classification Search
CPC .. H01M 8/1213; H01M 4/905; H01M 4/8621; H01M 2008/1293; H01M 8/243
See application file for complete search history.

(56) References Cited

U.S. PATENT DOCUMENTS

| | | | |
|---|---|---|---|
| 4,663,250 A | 5/1987 | Ong et al. | |
| 4,849,254 A | 7/1989 | Spengler et al. | |
| 6,656,625 B1 * | 12/2003 | Thompson | B32B 18/00 156/89.12 |

(Continued)

FOREIGN PATENT DOCUMENTS

CN           1672282           9/2005

OTHER PUBLICATIONS

International Preliminary Report on Patentability from International Application No. PCT/US2014/029095, dated Sep. 24, 2015, 9 pp.

(Continued)

*Primary Examiner* — Eli Mekhlin
(74) *Attorney, Agent, or Firm* — Dentons US LLP

(57) ABSTRACT

In some examples, solid oxide fuel cell system comprising a solid oxide fuel cell including an anode, an anode conductor layer, a cathode, a cathode conductor layer, and electrolyte, wherein the anode and the anode conductor layer each comprise nickel; and a sacrificial nickel source separate from that of the anode and anode conductor layer, wherein the sacrificial nickel source is configured to reduce the loss or migration of the nickel of the anode and/or the anode current collector in the fuel cell during operation.

12 Claims, 3 Drawing Sheets

(56) References Cited

U.S. PATENT DOCUMENTS

| | | | |
|---|---|---|---|
| 7,226,679 B2 | 6/2007 | Halliop et al. | |
| 7,465,509 B2 | 12/2008 | Halliop et al. | |
| 2003/0235752 A1* | 12/2003 | England | H01M 4/8605 |
| | | | 429/408 |
| 2008/0220310 A1* | 9/2008 | Mertens | H01M 4/86 |
| | | | 429/419 |
| 2011/0053032 A1* | 3/2011 | Gil | H01M 8/004 |
| | | | 429/458 |
| 2011/0111310 A1 | 5/2011 | Pastula et al. | |
| 2011/0300457 A1 | 12/2011 | Kuehn et al. | |
| 2013/0122393 A1 | 5/2013 | Liu et al. | |

OTHER PUBLICATIONS

Written Opinion from counterpart Singapore Application No. 11201507659T, dated Jun. 13, 2016, 6 pp.

Gubner et al., "Investigations into the Degradation of the Cermet Anode of a Solid Oxide Fuel Cell," Proceedings of the Fifth International Symposium on Solid Oxide Fuel Cells (SOFC-V), Electrochemical Proceedings, vol. 97, Mar. 1997, pp. 844-850.

International Search Report and Written Opinion of international counterpart application No. PCT/US2014/029095, dated Jun. 2, 2014, 12 pp.

Response to Written Opinion dated Jun. 13, 2016, from counterpart Singaporean Application No. 11201507659T, filed Nov. 9, 2016, 7 pp.

Examination Report from counterpart Singaporean Application No. 11201507659T dated Dec. 6, 2016, 3 pp.

First Office Action and Search Report, and translation thereof, from counterpart Chinese Application No. 201480024621.1, dated Feb. 24, 2017, 14 pp.

Examination Report from Australian Patent application No. 2014228901, dated Sep. 7, 2017, 4 pp.

* cited by examiner

FUEL CELL SYSTEM INCLUDING SACRIFICIAL NICKEL SOURCE

This application claims the benefit of U.S. Provisional Application No. 61/794,979, filed on Mar. 15, 2013, the entire content of which is incorporated herein by reference.

This invention was made with Government support under Assistance Agreement No. DE-FE0000303 awarded by Department of Energy. The Government has certain rights in this invention.

TECHNICAL FIELD

The disclosure generally relates to fuel cells, such as solid oxide fuel cells.

BACKGROUND

Fuel cells, fuel cell systems and interconnects for fuel cells and fuel cell systems remain an area of interest. Some existing systems have various shortcomings, drawbacks, and disadvantages relative to certain applications. Accordingly, there remains a need for further contributions in this area of technology.

SUMMARY

Example solid oxide fuels cell systems are described. In particular, example solid oxide fuel cell systems of the disclosure may include a sacrificial nickel source separate from the anode and anode conductive layers. The sacrificial nickel source may react with water vapor within the fuel side of the system during operation to form volatile Ni compounds (such as, e.g., Ni(OH)$_2$. In this manner, the amount of Ni lost from anodes and anode conductive layers in the fuel cell system may be reduced due to reaction of the sacrificial Ni sources as an alternative to that of the Ni in the anode and anode conductive layer.

In one example, the disclosure is directed to a solid oxide fuel cell system comprising a solid oxide fuel cell including an anode, an anode conductor layer, a cathode, a cathode conductor layer, and electrolyte, wherein the anode and the anode conductor layer each comprise nickel; and a sacrificial nickel source separate from that of the anode and anode conductor layer, wherein the sacrificial nickel source is configured to reduce the loss or migration of the nickel of the anode and/or the anode current collector in the fuel cell during operation.

In another example, the disclosure is directed to a method comprising forming a solid oxide fuel cell system, wherein the solid oxide fuel cell system comprises a solid oxide fuel cell including an anode, an anode conductor layer, a cathode, a cathode conductor layer, and electrolyte, wherein the anode and the anode conductor layer each comprise nickel; and a sacrificial nickel source separate from that of the anode and anode conductor layer, wherein the sacrificial nickel source is configured to reduce the loss or migration of the nickel of the anode and/or the anode current collector in the fuel cell during operation.

In another example, the disclosure is directed to a method comprising operating a solid oxide fuel cell system, the system comprising a solid oxide fuel cell including an anode, an anode conductor layer, a cathode, a cathode conductor layer, and electrolyte, wherein the anode and the anode conductor layer each comprise nickel; and a sacrificial nickel source separate from that of the anode and anode conductor layer, wherein the sacrificial nickel source is configured to reduce the loss or migration of the nickel of the anode and/or the anode current collector in the fuel cell during operation The details of one or more embodiments of the disclosure are set forth in the accompanying drawings and the description below. Other features, objects, and advantages of the disclosure will be apparent from the description and drawings, and from the claims.

BRIEF DESCRIPTION OF DRAWINGS

The description herein makes reference to the accompanying drawings wherein like reference numerals refer to like parts throughout the several views.

DETAILED DESCRIPTION

Figure 1:
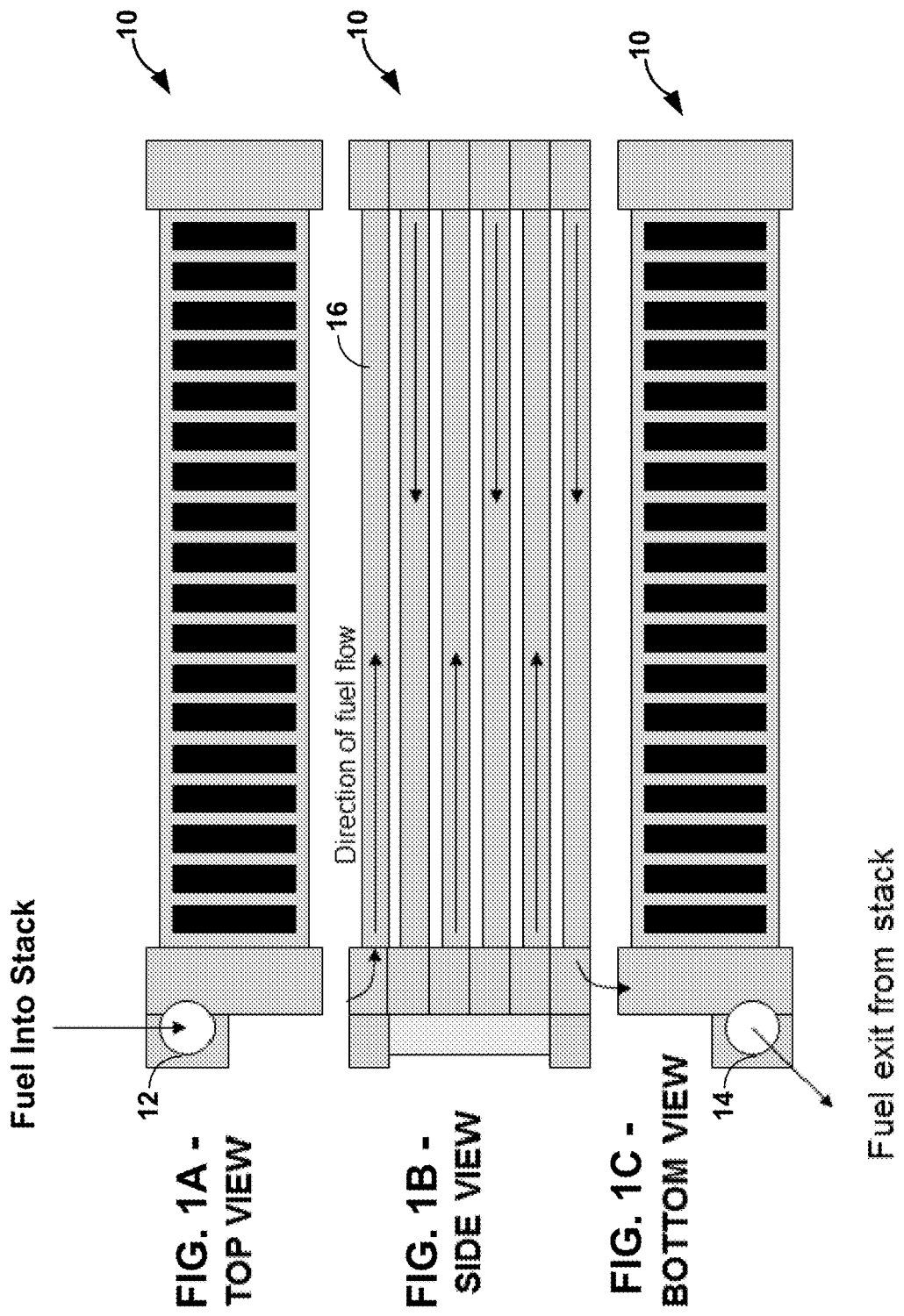
FIGS. 1A-1C are a schematic diagram illustrating an example fuel cell stack from top, side, and bottom views, respectively.

As described above, example solid oxide fuel cell systems of the disclosure may include a sacrificial nickel source separate from the anode and anode conductive layers. The sacrificial nickel source may react with water vapor within the systems during operation to form volatile Ni compounds (such as, e.g., Ni(OH)$_2$. For example, the sacrificial nickel source may react with water vapor within the fuel supply cavity of the fuel cell system. In this manner, the amount of Ni lost from anodes and anode conductive layers in the fuel cell system may be reduced due to reaction of the sacrificial Ni sources as an alternative to that of the Ni in the anode and anode conductive layer.

High steam content in the fuel of a solid oxide fuel cell system can lead to nickel loss or migration from nickel-based anodes and anode conductive layers. Such nickel loss or migration may severely impact the performance of the fuel cell system. In some examples, the nickel loss may be being mainly through the formation of volatile hydroxide species such as Ni(OH) in the presence of water vapor. In some examples, coatings onto the nickel particle surfaces may be employed for stabilized performance in steam. However, such coatings can adversely impact the electrochemical performance of the anode. Furthermore, in some tubular fuel cell designs, materials and processes developments may be required to achieve thin coatings that remain nearly continuous throughout the subsequent electrolyte and cathode firings of the tube. Such development may not be cost-effective for manufacturing.

In accordance with examples of the disclosure, a sacrificial nickel source may be provided as one of more location in a solid oxide fuel cell system to reduce or substantially eliminate loss of nickel from anodes and anode conductive layers by reacting with water vapor. In some examples, the sacrificial nickel source(s) may be placed at one or more locations in the fuel feed cavity that is upstream of the cell/stack (e.g., placed within the fuel manifold). This may saturate the fuel with the volatile nickel hydroxide species and hence could substantially eliminate or otherwise reduce the nickel loss from the Ni-based anode materials compared to those examples not including such sacrificial nickel sources.

Some examples of the present disclosure may have both cost and performance advantages over the approach of coating. The use of simple, low-cost sacrificial nickel source may offer substantial cost advantage to the anode coating technique. Although anode coating may be effective to some extent to reduce the nickel volatility and hence obtain relatively stable anode performance by covering up nickel surfaces in anode, the coating may at the same time reduce the active area of nickel. As a result, electrochemical performance of the anode may be adversely impacted. In contrast, examples of the present disclosure may not require a change any anode materials or processing and may not substantially impact anode performance.

The sacrificial nickel source may be place at one or more suitable locations in a fuel cell system. In some examples, the preferred locations the sacrificial Ni sources are as close to fuel cells layers as possible, and therefore located within the fuel feed tube channels. It may also be preferred to have the sacrificial Ni sources located where the steam product species from the fuel cell reaction are in their highest concentration and the $Ni(OH)_2$ volatility are the greatest, e.g., downstream in the later fuel feed tubes within a bundle of tubes and/or at later bundles in a series of bundles.

FIGS. 1A-1C are schematic diagrams illustrating an example fuel cell stack 10 of a fuel cell system from top, side, and bottom views, respectively. Fuel cell stack 10 of FIGS. 1A-1C is only one example configuration in which a sacrificial Ni source may be employed and other fuel cell system configurations are contemplated. Fuel cell stack 10 includes one of more electrochemical cells including an oxidant side and fuel side. The oxidant is generally air, but could also be pure oxygen ($O_2$) or other oxidants, e.g., including dilute air for fuel cell systems having air recycle loops, and is supplied to the electrochemical cell from the oxidant side. A fuel, such as a reformed hydrocarbon fuel, e.g., synthesis gas, is supplied to the electrochemical cells from fuel side via fuel feed cavities. Although air and synthesis gas reformed from a hydrocarbon fuel may be employed in some examples, it will be understood that electrochemical cells using other oxidants and fuels may be employed without departing from the scope of the present disclosure, e.g., pure hydrogen and pure oxygen.

As shown, fuel cell stack 10 includes a plurality of tubes (such as, e.g., tube 16). Fuel used for the electrochemical reaction by the solid oxide fuel cell may be fed into first tube of stack 10 via opening 12. The tubes of fuel cell stack 10 may define a fuel feed cavity used to feed the fuel to the fuel cell side of the electrochemical cells within stack 10. The fuel may travel through the fuel cavity of the tubes in stack 10 along the path indicated in FIGS. 1A-1C, and exit stack 10 via opening 14.

Any suitable solid oxide fuel cell system including one or more electrochemical cells may be utilized. Suitable examples include those examples described in U.S. Patent Application Publication No. 2003/0122393 to Liu et al., published May 16, 2013, the entire content of which is incorporated by reference. In some examples, a fuel cell system may include an anode conductive layer, an anode layer, an electrolyte layer, a cathode layer and a cathode conductive layer. In one form, the electrolyte layer may be a single layer or may be formed of any number of sub-layers. In each electrochemical cell, the anode conductive layer conducts free electrons away from the anode and conducts the electrons to the cathode conductive layer via an interconnect. The cathode conductive layer conducts the electrons to the cathode. An interconnect may be embedded in the electrolyte layer, and may be electrically coupled to anode conductive layer, and may be electrically conductive in order to transport electrons from one electrochemical cell to another.

As indicated above, the anode and/or anode conductive layer of the one or more electrochemical cell within stack 10 may include nickel. High steam content in the fuel side of a solid oxide fuel cell system can lead to nickel loss or migration from nickel-based anodes and anode conductive layers. Such nickel loss or migration may severely impact the performance of the fuel cell system. In some examples, the nickel loss may be being mainly through the formation of volatile hydroxide species such as Ni(OH) in the presence of water vapor.

In accordance with one or more examples of the disclosure, stack 10 may include one or more sacrificial Ni sources within the fuel feed cavity. In some examples, the one or more sacrificial Ni sources may be positioned to come into contact with the fuel supply of the system. For example, a sacrificial Ni source separate from that of the anode(s) and/or anode conductive layer(s) maybe located with the fuel feed cavity defined by the tubes of stack 10. The sacrificial nickel source may react with water vapor within the fuel side of the system during operation to form volatile Ni compounds (such as, e.g., $Ni(OH)_2$. In this manner, the amount of Ni lost from anodes and anode conductive layers in the fuel cell system may be reduced due to reaction of the sacrificial Ni sources as an alternative to that of the Ni in the anode and anode conductive layer. In some examples, fuel entering the fuel cell stack has been reformed external to the stack such that the sacrificial nickel sources do not substantially function as catalyst for reforming of the fuel.

Figure 2:
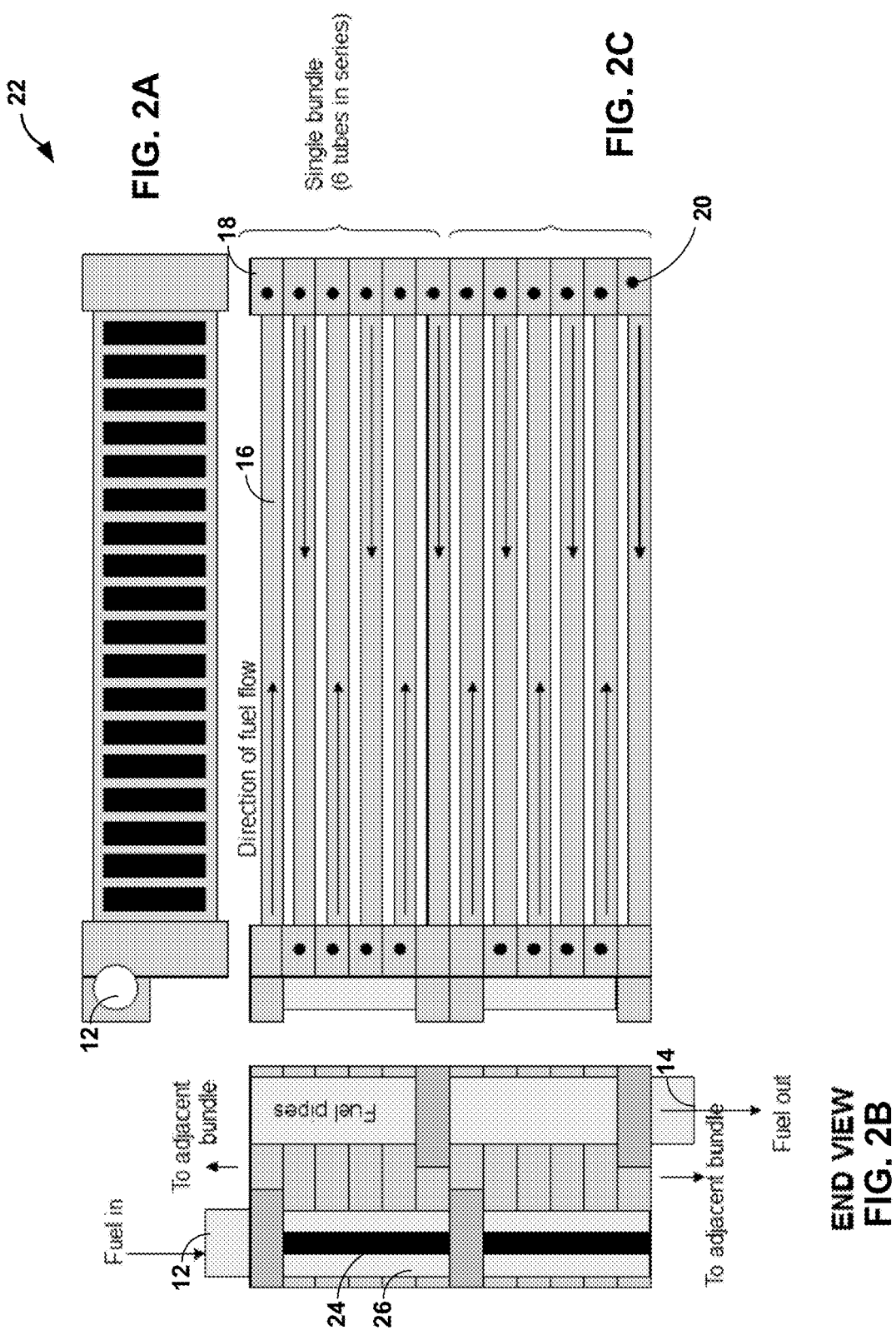
FIGS. 2A-2C are a schematic diagram illustrating an example fuel cell system including two bundles from top, end, and side views, respectively.

FIG. 2 is a schematic diagram illustrating an example fuel cell system 20 including two bundles from top, end, and side views. Each bundle contains six tubes in a series (such as tube 16). System 20 may function substantially similar to that of system 10, and may include a fuel feed cavity that define the flow of fuel of the fuel side of the electrochemical cells of system.

Again, to reduce nickel loss or migration from nickel-based anodes and anode conductive layers due to high steam content on the fuel side, a sacrificial Ni source may be employed within system 22. For example, a sacrificial Ni source (such as Ni source 24) may be placed within inlet fuel pipes 26 and/or within fuel manifolds 18 (such as Ni source 22) connecting adjacent fuel cell tubes. In some examples, the sacrificial nickel source may take the form of nickel or nickel alloy felt, wires, rods, and/or ribbons. The sacrificial nickel source may be located within a fuel cell system using any suitable technique. The sacrificial nickel source may react with water vapor within the fuel side of the system during operation to form volatile Ni compounds (such as, e.g., $Ni(OH)_2$.30

Figure 3:
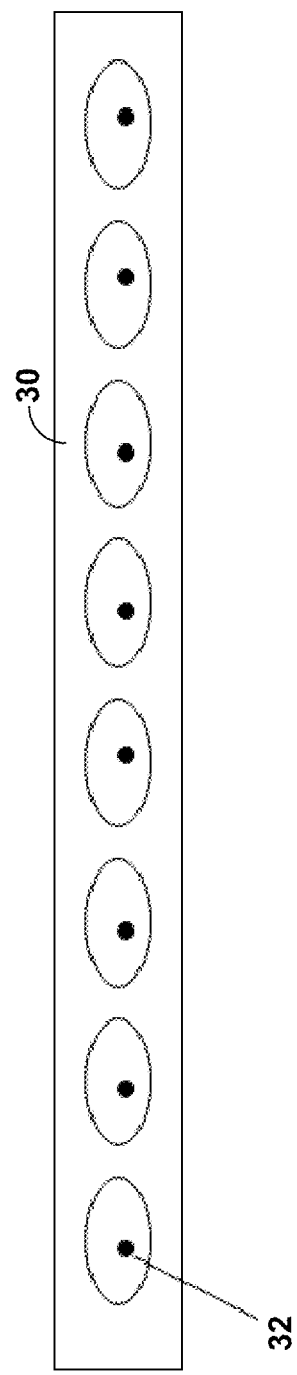
FIG. 3 is a schematic diagram illustrating an example porous ceramic substrate including a plurality of sacrificial nickel sources.

A sacrificial Ni source may be positioned at any suitable location within a fuel cell system to react with steam within the fuel feed. FIG. 3 illustrates a schematic diagram of a porous ceramic substrate 30 include a plurality of sacrificial nickel sources 32, e.g., in the form of Ni wire or gauze. In addition to sacrificial Ni sources 32, anode and anode conductive layers may be printed on such substrate along with other active fuel cell layers. In some examples, the sacrificial nickel source comprises a nickel cermet originating as a NiO+ceramic composite prior to the process of anode reduction. For example, NiO+ceramic material may be applied as a painted-on or wash coat to an interior surfaces of fuel manifolds, supply lines and/or substrates of the fuel cell system, and such application may take place during one or more intermediate assembly stages of the fuel cell stack and/or when at completed assembly.

Various embodiments of the invention have been described. These and other embodiments are within the scope of the following claims.

The invention claimed is:

1. A solid oxide fuel cell system comprising:
a plurality of solid oxide fuel cells each including an anode, an anode conductor layer, a cathode, a cathode conductor layer, and electrolyte, wherein the anode and the anode conductor layer each comprise nickel;
a fuel feed cavity;
a fuel cell stack of the plurality of solid oxide fuel cells and further including a plurality of tubes and a plurality of manifolds connecting the plurality of tubes in the fuel cell stack in series, wherein each tube of the plurality of tubes contains at least one of the anodes and at least one of the anode connector layers of the plurality of solid oxide fuel cells, wherein the plurality of tubes and the plurality of manifolds connecting the tubes defines a portion of the fuel feed cavity of the fuel cell stack;
an inlet fuel pipe that supplies the portion of fuel feed cavity defined by the plurality of tubes and the plurality of manifolds connecting the tubes; and
a sacrificial nickel source separate from that of the anodes and anode conductor layers of the plurality of solid oxide fuel cells,
wherein the sacrificial nickel source is located within a respective tube of the plurality of tubes containing the at least one of the anodes and the at least one of the anode connector layers of the plurality of electrochemical cells and located downstream of a first anode of the at least one of the anodes and a first anode connector layer of the at least one of the anode connector layers contained by the respective tube in the fuel feed cavity,
wherein the sacrificial nickel source is located upstream of a second anode of the at least one of the anodes and a second anode connector layer of the at least one of the anode connector layers contained by the respective tube in the fuel feed cavity,
wherein the sacrificial nickel source is also located in at least one manifold of the plurality of manifolds, and
wherein the sacrificial nickel source reduces the loss or migration of the nickel of the anodes and anode conductor layers in the fuel feed cavity during operation by reacting with water vapor in the fuel feed cavity to saturate fuel within the fuel feed cavity with volatile nickel hydroxide species during operation of the fuel cell system.

2. The fuel cell system of claim 1, wherein the system includes a reformer that reforms the fuel before entering the fuel feed cavity such that the sacrificial nickel source does not substantially function as catalyst for reforming of the fuel.

3. The fuel cell system of claim 1, wherein the volatile nickel hydroxide species comprises $Ni(OH)_2$.

4. The fuel cell system of claim 1, wherein the sacrificial nickel source comprises at least one of nickel or nickel alloy felt, nickel or nickel alloy wires, nickel or nickel alloy rods, or nickel or nickel alloy ribbons.

5. The fuel cell system of claim 1, wherein the sacrificial nickel source comprises a nickel cermet originating as a composite including NiO and ceramic prior to the process of anode reduction.

6. The fuel cell of claim 5, wherein the composite forms a coating an interior surface of at least one manifold of the plurality of fuel manifolds.

7. The fuel cell system of claim 1, wherein the sacrificial nickel source is located in a position to come into contact with a fuel supply of the system.

8. The fuel cell system of claim 1, wherein the anode and anode conductive layer are on an interior surface of the respective tube of the plurality of tubes, and wherein the sacrificial nickel source is on the interior surface.

9. The fuel cell system of claim 1, wherein the sacrificial nickel source is located downstream of the inlet fuel pipe in a later tube of the plurality of tubes.

10. The fuel cell system of claim 1, wherein the sacrificial nickel source is located in the inlet fuel pipe.

11. The fuel cell system of claim 1, wherein the sacrificial nickel source is located downstream of another tube of the plurality of tubes containing the at least one of the anodes and the at least one of the anode connector layers of the plurality of electrochemical cells.

12. The fuel cells system of claim 1, wherein the plurality of tubes are connected in series with each other individually.

* * * * *